US009493365B2

(12) United States Patent
Sun et al.

(10) Patent No.: US 9,493,365 B2
(45) Date of Patent: Nov. 15, 2016

(54) CATHODE ACTIVE MATERIAL WITH WHOLE PARTICLE CONCENTRATION GRADIENT FOR LITHIUM SECONDARY BATTERY, METHOD FOR PREPARING SAME, AND LITHIUM SECONDARY BATTERY HAVING SAME

(75) Inventors: Yang-Kook Sun, Seoul (KR); Hyung Joo Noh, Bucheon-si (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 0 days.

(21) Appl. No.: 13/978,041

(22) PCT Filed: Dec. 27, 2011

(86) PCT No.: PCT/KR2011/010175
§ 371 (c)(1),
(2), (4) Date: Oct. 8, 2013

(87) PCT Pub. No.: WO2012/093798
PCT Pub. Date: Jul. 12, 2012

(65) Prior Publication Data
US 2014/0131616 A1    May 15, 2014

(30) Foreign Application Priority Data

Jan. 5, 2011  (KR) ................. 10-2011-0000841
Mar. 10, 2011 (KR) ................. 10-2011-0021579
Nov. 22, 2011 (KR) ................. 10-2011-0122544

(51) Int. Cl.
H01M 4/131  (2010.01)
C01D 15/02  (2006.01)
(Continued)

(52) U.S. Cl.
CPC ............. *C01D 15/02* (2013.01); *H01M 4/131* (2013.01); *H01M 4/364* (2013.01); *H01M 4/366* (2013.01);
(Continued)

(58) Field of Classification Search
CPC .................................................... H01M 4/131
USPC ................................... 252/182.1; 429/231.95
See application file for complete search history.

(56) References Cited

U.S. PATENT DOCUMENTS 8,591,774 B2    11/2013  Koenig, Jr. et al.
2002/0192552 A1 12/2002  Lampe-Onnerud et al.
2012/0080649 A1* 4/2012  Koenig et al. ............. 252/519.2

FOREIGN PATENT DOCUMENTS

EP      2 214 234 A1    8/2010
JP      2009-137834 A   6/2009
(Continued)

OTHER PUBLICATIONS

International Search Report of PCT/KR2011/010175 dated Aug. 24, 2012.
(Continued)

*Primary Examiner* — Peter F Godenschwager
(74) *Attorney, Agent, or Firm* — Lucas & Mercanti, LLP

(57) ABSTRACT

The present invention relates to a cathode active material, method for preparing same, and a lithium secondary battery having same, and more specifically, to a composite cathode active material, a method for preparing same, and a lithium secondary battery having same, the composite cathode active material having excellent lifespan characteristics and charge/discharge characteristics due to the stabilization of crystal structure, and thermostability even in high temperatures.

14 Claims, 24 Drawing Sheets

(51) Int. Cl.
| | | |
|---|---|---|
| *H01M 4/36* | (2006.01) | |
| *H01M 4/48* | (2010.01) | |
| *H01M 4/505* | (2010.01) | |
| *H01M 4/525* | (2010.01) | |
| *H01M 4/50* | (2010.01) | |
| *H01M 4/52* | (2010.01) | |
| *H01M 4/54* | (2006.01) | |
| *H01M 10/0525* | (2010.01) | |
| *H01M 10/052* | (2010.01) | |
| *H01M 4/02* | (2006.01) | |

(52) U.S. Cl.
CPC ............. *H01M 4/483* (2013.01); *H01M 4/502* (2013.01); *H01M 4/505* (2013.01); *H01M 4/523* (2013.01); *H01M 4/525* (2013.01); *H01M 4/54* (2013.01); *H01M 10/0525* (2013.01); *H01M 10/052* (2013.01); *H01M 2004/028* (2013.01); *Y02E 60/122* (2013.01)

(56) References Cited

FOREIGN PATENT DOCUMENTS

| JP | 2009-206047 A | 9/2009 |
|---|---|---|
| KR | 2001-0081181 A | 8/2001 |
| KR | 2003-0033716 A | 5/2003 |
| KR | 2008-0079072 A | 8/2008 |
| WO | WO 2004/040677 A1 | 5/2004 |
| WO | WO 2007/114557 A1 | 10/2007 |

OTHER PUBLICATIONS

G.M. Koenig, Jr, et al; Chemistry of Materials, 23: 1954-1963 (2011).
Z. Chen et al; Materials Research Society, vol. 36: 498-505 (2011).
Y.K. Sun et al; Advanced Functional Materials, 20: 485-491 (2010).
Z. Chen et al; Journal of Materials Chemistry, 20: 7606-7612 (2010).
Y.K. Sun et al; Journal of Materials Chemistry, 21: 10108-10112 (2011).
Y.K. Sun et al; Electrochimica Acta, 55: 8621-8627 (2010).
Y.K. Sun et al; Journal of The Electrochemical Society, 159: A1-A5 (2012).
H.J. Noh et al; Advanced Functional Materials, 23: 1028-1036 (2013).
S.T. Myung et al; Journal of Materials Chemistry, 20: 7074-7095 (2010).
Y.K. Sun et al; Nature Materials, vol. 8: 320-324 (2009).
Y.K. Sun et al; Nature Materials, vol. 11: 942-947 (2012).
H.J. Noh et al; Chemistry of Materials, 25: 2109-2115 (2013).
European Search Report—Application No. EP 11854697, dated Dec. 9, 2014.

* cited by examiner

US 9,493,365 B2

CATHODE ACTIVE MATERIAL WITH WHOLE PARTICLE CONCENTRATION GRADIENT FOR LITHIUM SECONDARY BATTERY, METHOD FOR PREPARING SAME, AND LITHIUM SECONDARY BATTERY HAVING SAME

CROSS REFERENCE TO RELATED APPLICATION

This Application is a 371 of PCT/KR2011/010175 filed on Dec. 27, 2011, which claims the priority of Korean Patent Application No. 10-2011-0000841 filed on Jan. 5, 2011; Korean Patent Application No. 10-2011-0021579 filed Mar. 10, 2011 and Korean Patent Application No. 10-2011-0122544 filed Nov. 22, 2011, the contents of each of which are incorporated herein by reference in their entirety.

FIELD OF THE INVENTION

The present invention relates to a cathode active material with whole particle concentration gradient for a lithium secondary battery, a method for preparing same, and a lithium secondary battery having same, and more specifically, to a cathode active material with whole particle concentration gradient for a lithium secondary battery, a method for preparing same, and a lithium secondary battery having same, which has excellent lifetime characteristics and charge/discharge characteristics through the stabilization of crystal structure, and has thermostability even in high temperatures.

BACKGROUND OF THE INVENTION

On the strength of recent rapid development of electronics, communications, computer industry, etc., the use of portable electronic devices such as camcorders, mobile phones, notebook PCs and the like becomes generalized. Accordingly, there is increasing demand for batteries which are lightweight and highly reliable, and can be used longer.

In particular, lithium secondary batteries, whose operating voltage is 3.7 V or more, have higher energy density per unit weight than nickel-cadmium batteries and nickel-hydrogen batteries. Accordingly, the demand for the lithium secondary batteries as a power source to drive the portable electronic communication devices is increasing day by day.

Recently, studies on power sources for electric vehicles by hybridizing an internal combustion engine and a lithium secondary battery are actively conducted in the United States, Japan, Europe and the like. The development of a plug-in hybrid (P-HEV) battery used in the car with a mileage of less than 60 miles is actively proceeding around United States. The P-HEV battery is a battery having characteristics, which are nearly the characteristics of an electric vehicle, and the biggest challenge is to develop high-capacity batteries. In particular, the biggest challenge is to develop cathode materials having higher tap density of 2.0 g/cc or more and high capacity characteristics of 230 mAh/g or more.

The materials, which are currently available or under development, are $LiCoO_2$, $LiNiO_2$, $LiMnO_2$, $LiMn_2O_4$, $Li_{1+x}[Mn_{2-x}M_x]O_4$, $LiFePO_4$ and the like. Of them, the $LiCoO_2$ is an excellent material having stable charge/discharge characteristics, excellent electronic conductivity, high cell voltage, high stability and even discharge voltage characteristics. However, because Co has low reserves and is expensive and toxic to the human body, it is needed to develop other cathode materials. Further, it has a defect of very poor thermal properties by unstable crystal structure by delithiation during discharging.

In order to improve it, there may be many attempts to shift the exothermic onset temperature to the side of the higher temperature and to make an exothermic peak broad in order to prevent rapid heat-emitting, by substitute a part of the nickel with transition metals. However, there is no satisfactory result yet.

Namely, $LiNi_{1-x}Co_xO_2$ (x=0.1-0.3) material, wherein a part of the nickel is substituted with cobalt, shows excellent charge/discharge characteristics and lifetime characteristics, but the thermostability problem is not solved yet. Furthermore, European Patent No. 0872450 discloses $Li_aCo_bMn_cM_dNi_{1-(b+c+d)}O_2$ (M=B, Al, Si. Fe, Cr, Cu, Zn, W, Ti, Ga)-type, where the Ni is substituted with other metals as well as Co and Mn, but the thermostability of the Ni-based material is not solved yet.

In order to eliminate these shortcomings, Korean Patent Publication No. 2005-0083869 suggests lithium-transition metal oxides having metal composition representing concentration gradient. This method is a method that an internal materials with a certain composition is synthesized and materials with other composition is coated on the exterior thereof to obtain a bi-layer, and is mixed with a lithium salt followed by heat-treatment. The internal material may be commercially available lithium transition metal oxides. However, in this method, the metal composition of the cathode active material between the produced internal material and the external material is discontinuously changed, and is not continuously and gradually changed. Further, the powder synthesized by the invention, which does not use ammonia as a chelating agent, was not suitable for a cathode active material for a lithium secondary battery due to its lower tap density.

In order to improve this problem, Korean Patent Publication No. 2007-0097923 suggests a cathode active material, which has an internal bulk part and an external bulk part, and the metal ingredients have continuous concentration distribution depending on their position at the external bulk part. However, in this method, there was a need to develop a cathode active material of a new structure having better stability and capacity because the concentration is constant at the internal bulk part and the metal composition is changed at the external bulk part.

SUMMARY OF THE INVENTION

In order to solve the above-described problems associated with prior art, the present invention is objected to provide a cathode active material, which has excellent lifetime characteristics and charge/discharge characteristics through the stabilization of crystal structure, and has thermostability even in high temperatures.

Further, the present invention is objected to provide a method for preparing the cathode active material for lithium secondary battery.

Further, the present invention is objected to provide a lithium secondary battery including the cathode active material.

In order to accomplish one object of the present invention, the present invention provides, in a cathode active material for a lithium secondary battery, a cathode active material with whole particle concentration gradient for a lithium secondary battery, wherein the concentration of all metals making up the cathode active material for a lithium secondary battery shows continuous concentration gradient in the entire region, from the particle core to the surface part.

In the present invention, the cathode active material for a lithium secondary battery with whole particle concentration gradient is characterized that it may comprise:

the core expressed by the following formula 1; and
the surface part expressed by the following formula 2,
wherein the concentrations of the M1, the M2 and the M3 have continuous concentration gradient from the core to the surface.

  [Formula 1]

  [Formula 2]

(in the formulas 1 and 2, M1, M2 and M3 are selected from the group consisting of Ni, Co, Mn and a combination thereof; M4 is selected from the group consisting of Fe, Na, Mg, Ca, Ti, V, Cr, Cu, Zn, Ge, Sr, Ag, Ba, Zr, Nb, Mo, Al, Ga, B and a combination thereof; $0<a1\leq1.1$, $0<a2\leq1.1$, $0\leq x1\leq1$, $0\leq x2\leq1$, $0\leq y1\leq1$, $0\leq y2\leq1$, $0\leq z1\leq1$, $0\leq z2\leq1$, $0\leq w\leq0.1$, $0.0\leq\delta\leq0.02$, $0\leq x1+y1+z1\leq1$, $0\leq x2+y2+z2\leq1$, $x1\leq x2$, $y1\leq y2$ and $z2\leq z1$.)

Further, the present invention provides a method for preparing the cathode active material for a lithium secondary battery comprises:

a first step of preparing a metal salt aqueous solution for forming the core and a metal salt aqueous solution for forming the surface part, which contain the M1, the M2 and the M3 as a metal salt aqueous solution, wherein the concentrations of the M1, the M2 and the M3 are different each other;

a second step of forming precipitates by mixing the metal salt aqueous solution for forming the core and the metal salt aqueous solution for forming the surface part at a mixing ratio from 100 v %:0 v % to 0 v %:100 v % with gradual change and by mixing a chelating agent and a basic aqueous solution to a reactor at the same time, wherein the concentrations of the M1, the M2 and the M3 have continuous concentration gradient from the core to the surface part;

a third step of preparing an active material precursor by drying or heat-treating the obtained precipitates; and a fourth step of mixing the active material precursor and a lithium salt and then heat-treating thereof.

Further, the present invention provides a lithium secondary battery comprising the cathode active material according to the present invention.

Advantageous Effects of the Invention

In the cathode active material for a lithium secondary battery according to the present invention, the concentrations of all metals contained in the cathode active material are increased or decreased with continuous concentration gradient from the core to the surface part. Accordingly, the crystal structure is stabilized and the thermostability is increased because there is no phase boundary having rapid concentration change from the core to the surface part.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Figure 1:
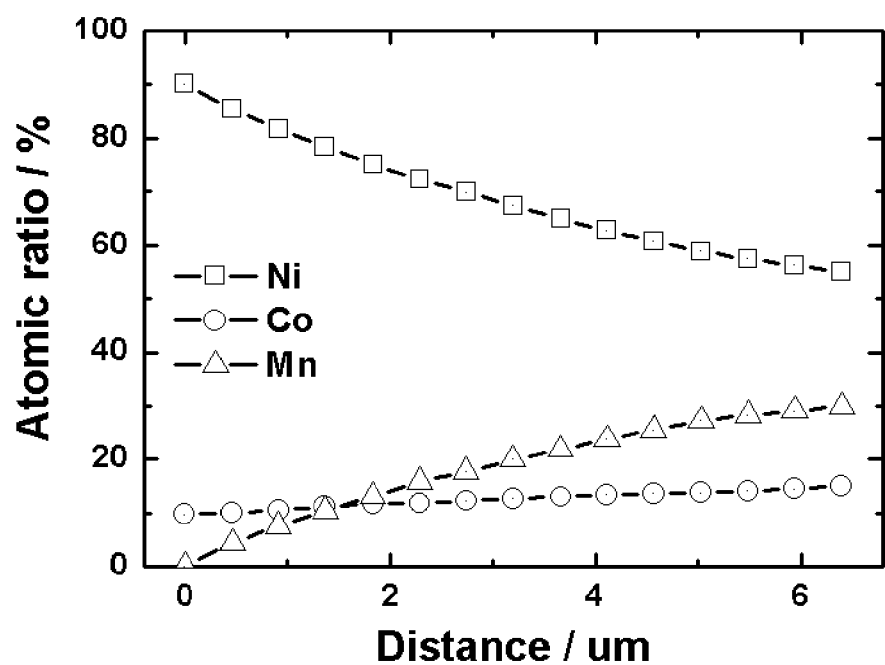
FIGS. 1 to 6: the results measuring the atomic ratio in each precursor particle prepared in Examples 1 to 6 of the present invention, respectively.

Hereinafter, the present invention will be described in detail.

Unlike the prior art that the metal concentration is constant at the interior region, but the metal concentration shows gradual concentration gradient at the exterior region, in the cathode active material of the present invention, all metals making up the cathode active material show continuous concentration gradient in the whole region from the particle core to the surface part.

Namely, in the cathode active material of the present invention, the concentrations of all metals making up the cathode active material are increased or decreased with continuous concentration gradient in the whole region from the particle core to the surface part.

The present invention is characterized that the concentrations of the M1 and the M2 are increased with continuous concentration gradient from the core to the surface part, and the concentration of the M3 is decreased with continuous concentration gradient from the core to the surface part.

Further, the present invention is characterized that the concentration of the M2 is increased with continuous concentration gradient from the core to the surface part, and the concentrations of the M1 and the M3 are decreased with continuous concentration gradient from the core to the surface part.

In the present invention, "metal concentration shows continuous concentration gradient" refers that the concentration of metal except for lithium exists with concentration distribution, which is changed gradually from the core of the active material particle to the surface part. The concentration gradient refers that there may be metal concentration difference of 0.1 to 30 mol %, preferably 0.1 to 20 mol %, more preferably 1 to 10 mol % per 0.1 μm, from the particle core to the surface part. In the present invention, the particle core refers to the range within the diameter 0.2 μm from the center of the active material particle, and the particle surface part refers to the range within the diameter 0.2 μm from the outermost of the particle.

In the present invention, it is preferred that the concentration gradients of the M1, the M2 and the M3 are constant from the particle core to the surface part. Namely, in the present invention, in terms of the structure stability, it is preferred that the concentrations of the M1 and the M2 are continuously increased as continuous concentration gradient form the core to the surface part, and the concentration of the M3 is continuously decreased as continuous concentration gradient from the core to the surface part. Further, in the present invention, in terms of the structure stability, it is preferred that the concentration of the M2 is continuously increased as continuous concentration gradient from the core to the surface part, and the concentrations of the M1 and the M3 are continuously decreased as continuous concentration gradient from the core to the surface part.

In the present invention, the M1 may be Co, the M2 may be Mn, and the M3 may be Ni. Namely, the concentration of the Ni is decreased in the whole particle, the concentration of the Mn is increased in the whole particle, and the concentration of the Co shows concentration gradient in the whole particle, but any structure of increase or decrease may be used.

In the present invention, it is preferred that the concentration range of the M3 at the core, z1 may be $0.6 \leq z1 \leq 1$ so as to maintain the nickel concentration in the core high, and the concentration difference of the nickel between the core and the surface part of the M3 may be $0.2 \leq |z2-z1| \leq 0.4$ so as to show thermostability and to prevent the capacity reduction.

In the present invention, it is preferred that the concentration range of the M1 at the core, x1 may be $0 \leq x1 \leq 0.2$, and the concentration difference between the core and the surface part of the M1 may be $0.05 \leq |x2-x1| \leq 0.1$, so as to reduce the amount of the Co and to prevent the capacity reduction at the same time.

In the present invention, it is preferred that the concentration range of the M2 at the core, y1 may be $0 \leq y1 \leq 0.1$ and the Mn content a the surface par may be 0.2 or more, so as to have thermostability and the prevent the capacity reduction at the same time, and the concentration difference of the manganese between the core and the surface part of the M2 may be $0.2 \leq |y2-y1| \leq 0.4$.

Hereinafter, the method for preparing the cathode active material of the present invention will be described.

First of all, a metal salt aqueous solution for forming the core and a metal salt aqueous solution for forming the surface part, which contain the M1, the M2 and the M3 as a metal salt aqueous solution, wherein the concentrations of the M1, the M2 and the M3 are different each other, are prepared.

The metal salt aqueous solution for forming the core and the metal salt aqueous solution for forming the surface part may be prepared by adding nickel salt, cobalt salt, manganese salt and salts containing M to a solvent, or may be prepared by preparing aqueous solution containing nickel salt, cobalt salt, manganese salt and salts containing M, respectively followed by mixing thereof for using. The metal salt may be sulfate, nitrate, acetate, halide, hydroxide and the like, and it may be any salt, which can be dissolved in water, without particular limitation.

Then, the metal salt aqueous solution for forming the core and the metal salt aqueous solution for forming the surface part are mixed together and simultaneously, the chelating agent and the basic aqueous solution are mixed in a reactor so as to obtain a precipitate wherein the concentrations of the M1, the M2 and the M3 have continuous concentration gradients from the core to the surface part.

In the present invention, a precipitate having continuous concentration gradient from the particle core to the surface part, from the particle forming process through one coprecipitation process, by mixing the metal salt aqueous solution for forming the core and the metal salt aqueous solution for forming the surface part from the initial stage of the particle forming process and supplying thereof continuously at the same time. The produced concentration gradient and its gradient may be controlled according to the compositions and the mixing and supplying ratio of the metal salt aqueous solution for forming the core and the metal salt aqueous solution for forming the surface part. The entire particle size may be controlled by adjusting the reaction time to 1 to 10 hours.

Further, the present invention is characterized that the molar ratio of the chelating agent and the metal salt may be 0.2 to 1.0:1.

The chelating agent may be ammonia aqueous solution, ammonium sulfate aqueous solution and a combination thereof. It is preferred that the molar ratio of the chelating agent and the metal salt may be 0.2 to 0.5:1, 0.2 to 0.4:1. The reason to set the molar ratio of the chelating agent to 0.2 to 1.0 based on the metal aqueous solution 1 mole, is that the chelating agent forms a complex by reacting with metal at the ratio of 1:1 or more, but the chelating agent remained after the reaction of sodium hydroxide and the complex may be changed to intermediates and then recovered as the chelating agent. Furthermore, the reason is that it is the best condition for improving and stabilizing the crystallinity of the cathode active material.

The concentration of the basic aqueous solution may be 2 M to 10 M, preferably. If the concentration of the basic aqueous solution is less than 2 M, particle forming may take longer, tap density may be deteriorated, and the yield of the co-precipitation reaction product may be reduced. And, if the concentration is over 10 M, it is not preferred because it may be difficult to form homogeneous particles due to rapid particle growth by rapid reaction, and the tap density may be also reduced.

In the second step, the reaction atmosphere of the transition metal aqueous solution may be under a nitrogen flow, pH may be within 10 to 12.5, reaction temperature is within 30 to 80° C., and reaction stirring speed may be within 100 to 2000 rpm, preferably.

Then, in the third step, the obtained precipitate may be dried or heat-treated to prepare an active material precursor. The drying process may be conducted at 110° C. to 400° C. for 15 to 30 hours.

Finally, the active material precursor and the lithium salt are mixed and then heat-treated to obtain an active material.

It is preferred that the heat-treating process after mixing the active material precursor and the lithium salt may be conducted at 700° C. to 1100° C. The heat-treating atmosphere may be in an oxidative atmosphere of air or oxygen or a reductive atmosphere of nitrogen or hydrogen, preferably, and the heat-treating time may be 10 to 30 hours, preferably. During this heat-treating process, metal may be diffused even at the part where the internal metal concentration is constant, and consequently, a metal oxide having continuous metal concentration distribution from the core to the surface may be obtained.

Before the heat-treating process, a pre-calcining process may be conducted by maintaining at 250 to 650° C. for 5 to 20 hours. Further, after the heat-treating process, an annealing process may be conducted at 600 to 750° C. for 10 to 20 hours.

Further, the present invention may further include a step of adding sintering additives when mixing the active material precursor and the lithium salt, preferably. The sintering additives may be any one selected from the group consisting of compounds containing ammonium ion, metal oxides, metal halides and a combination thereof, preferably.

The compounds containing ammonium ion may be any one selected from the group consisting of $NH_4F$, $NH_4NO_3$, $(NH_4)_2SO_4$, and a combination thereof, preferably; the metal oxides may be any one selected from the group consisting of $B_2O_3$, $Bi_2O_3$, and a combination thereof, preferably; and the metal halides may be any one selected from the group consisting of $NiCl_2$, $CaCl_2$, and a combination thereof, preferably.

The sintering additives may be used in an amount of 0.01~0.2 mole based on the active material precursor 1 mole, preferably. If the amount of the sintering additives is too low, the sintering effect of the active material precursor may not be improved a lot, and if the amount is higher than the said range, the initial capacity during charging/discharging may be reduced or the performance of the cathode active material may be deteriorated.

Further, the present invention provides a lithium secondary battery including the cathode active material according to the present invention.

The lithium battery may include a cathode including the cathode active material having the above constitution, an anode including anode active material and a separator existing between thereof. Further, it may include an electrolyte, which is immersed in the cathode, the anode and the separator. The anode active material may be a material which can reversibly absorb or release lithium ions, preferably, for example, a material including artificial graphite, natural graphite, graphitized carbon fiber, amorphous Carbon, and metal lithium also can be used as a cathode active material. The electrolyte may be a liquid electrolyte containing lithium salts and non-aqueous organic solvent, or polymer gel electrolyte.

Hereinafter, the present invention is explained by the following Examples and Test Examples in more detail. The following Examples and Test Examples are intended to further illustrate the present invention, and the scope of the present invention cannot be limited thereby in any way.

Example 1

In order to prepare a compound, wherein the Ni concentration is continuously decreased from the core to the surface, the Co and the Mn concentrations are continuously increased, a 2.4 M metal aqueous solution, prepared by mixing nickel sulfate and cobalt sulfate at the molar ratio of 80:20, as a metal salt aqueous solution for forming the core and a metal aqueous solution containing nickel sulfate, cobalt sulfate and manganese sulfate at the molar ratio of 55:15:30 as a metal salt aqueous solution for forming the surface part were prepared.

Distilled water 4 L was put into a coprecipitation reactor (Capacity: 4 L, power of a rotation motor: 80 W); nitrogen gas was supplied to the reactor at the speed of 0.5 L/min so as to remove dissolved oxygen; and stirred at 1000 rpm while maintaining the temperature of the reactor at 50° C.

The metal salt aqueous solution for forming the core and the metal salt aqueous solution for forming the surface part were mixed at a certain ratio, and simultaneously supplied into the reactor at the rate of 0.3 L/hour. Further, 3.6 M ammonia solution was continuously supplied into the reactor at the rate of 0.03 L/hour. Further, for adjusting pH, 4.8 M NaOH aqueous solution was supplied to maintain pH in the reactor at 11. Then, the impeller speed of the reactor was controlled to 1000 rpm, and the co-precipitation reaction was conducted until the diameter of the obtained precipitate became 1 μm. At this time, the flow rate was controlled to make the average retention time of the solution in the reactor about 2 hours, and after the reaction reached to the steady state, the reactant was kept at the steady state for a certain time to so as to obtain a co-precipitated compound having higher density. The compound was filtered, washed with water, and dried with 110° C. warm air dryer for 15 hours so as to obtain an active material precursor.

$LiNO_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material particle. The size of the finally obtained active material particle was 12 μm.

Example 2 to Example 5

The procedure of Example 1 was repeated except for mixing nickel sulfate, cobalt sulfate and manganese sulfate of the metal salt aqueous solution for forming the core and the metal salt aqueous solution for forming the surface part at the molar ratio as listed in the following Table 1 so as to obtain an active material particle.

Example 6

A cathode active material, which has the same composition with Examples 1 was prepared by using a batch reactor.

Distilled water 2.5 L was put into a coprecipitation batch reactor (Capacity: 8 L, power of a rotation motor: 180 W); nitrogen gas was supplied to the reactor at the speed of 0.6 L/min so as to remove dissolved oxygen; and stirred at 450 rpm while maintaining the temperature of the reactor at 50° C.

The metal salt aqueous solution for forming the core and the metal salt aqueous solution for forming the surface part having the same concentration with Example 3 were mixed at a certain ratio, and simultaneously supplied into the reactor at the rate of 0.2 L/hour. Further, 4.8 M ammonia solution was continuously supplied into the reactor at the rate of 0.1 L/hour. Further, for adjusting pH, 10 M NaOH aqueous solution was supplied to maintain pH in the reactor at 11. Then, the impeller speed of the reactor was controlled to 450 rpm, and the reaction solution was supplied until the total amount of the initially added distilled water, the added metal aqueous solution, the ammonia solution and the NaOH solution became 8 L. The compound was filtered, washed with water, and dried with 110° C. warm air dryer for 15 hours so as to obtain an active material precursor.

$LiNO_3$ as a lithium salt was mixed to the obtained active material precursor, heated at a rate of 2° C./min, and then pre-calcined by maintaining at 280° C. for 10 hours followed by calcining at 750° C. for 15 hours to obtain a final active material. The size of the finally obtained active material particle was 12 μm.

TABLE 1

| | Metal salt aqueous solution for forming the core | | | Metal salt aqueous solution for forming the surface part | | |
| --- | --- | --- | --- | --- | --- | --- |
| | Ni | Co | Mn | Ni | Co | Mn |
| Example 1 | 90 | 10 | 0 | 55 | 15 | 30 |
| Example 2 | 90 | 10 | 0 | 60 | 13 | 27 |
| Example 3 | 90 | 10 | 0 | 65 | 05 | 33 |
| Example 4 | 90 | 10 | 0 | 75 | 05 | 20 |
| Example 5 | 85 | 10 | 5 | 70 | 05 | 25 |
| Example 6 | 90 | 10 | 0 | 55 | 15 | 30 |

Comparative Example

An cathode active material, wherein the molar ratio of the nickel, the cobalt and the manganese is as listed in the following Table 2, respectively, and each concentration in the whole active material is not changed so as to have constant composition, was prepared.

TABLE 2

|  | Ni | Co | Mn |
| --- | --- | --- | --- |
| Comparative Example 1 | 80 | 07 | 13 |
| Comparative Example 2 | 75 | 07 | 18 |
| Comparative Example 3 | 70 | 09 | 21 |
| Comparative Example 4 | 65 | 10 | 25 |
| Comparative Example 5 | 75 | 07 | 18 |
| Comparative Example 6 | 90 | 10 | 0 |
| Comparative Example 7 | 85 | 10 | 5 |

Test Example 1

Confirmation of Concentration Gradient Structure in Precursor Particle

Figure 2:
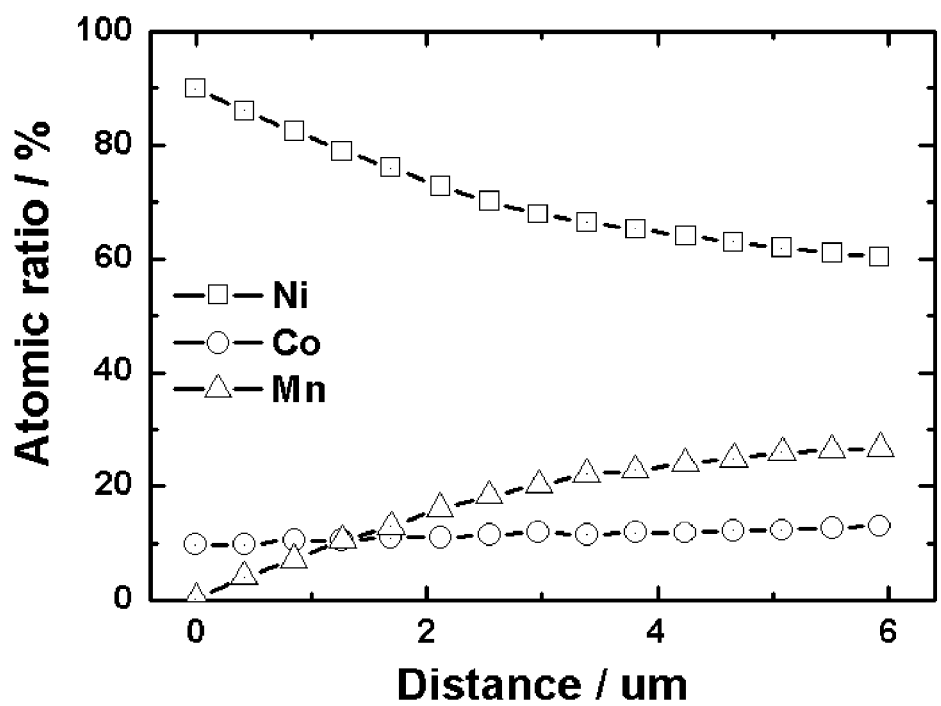
Figure 3:
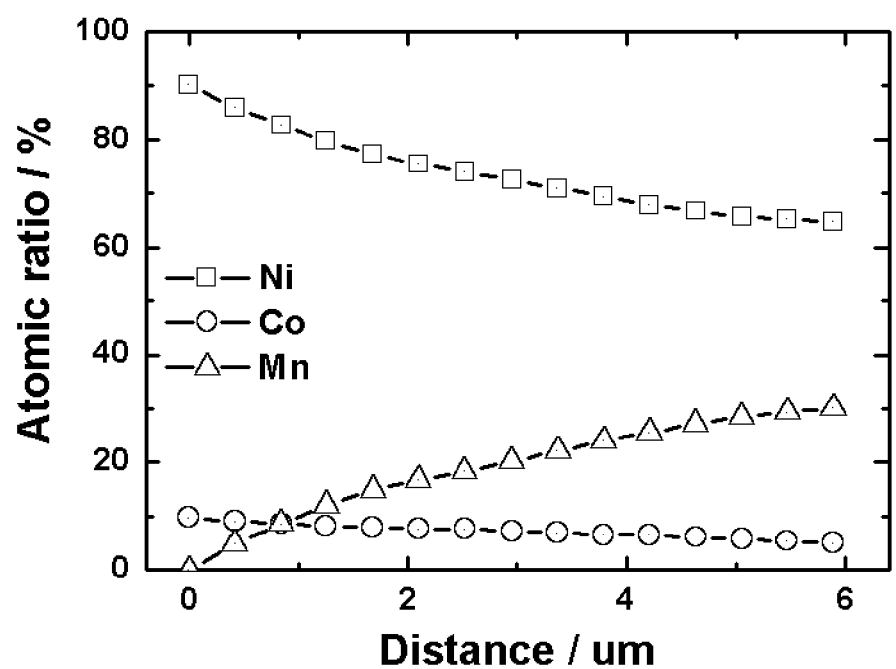
Figure 4:
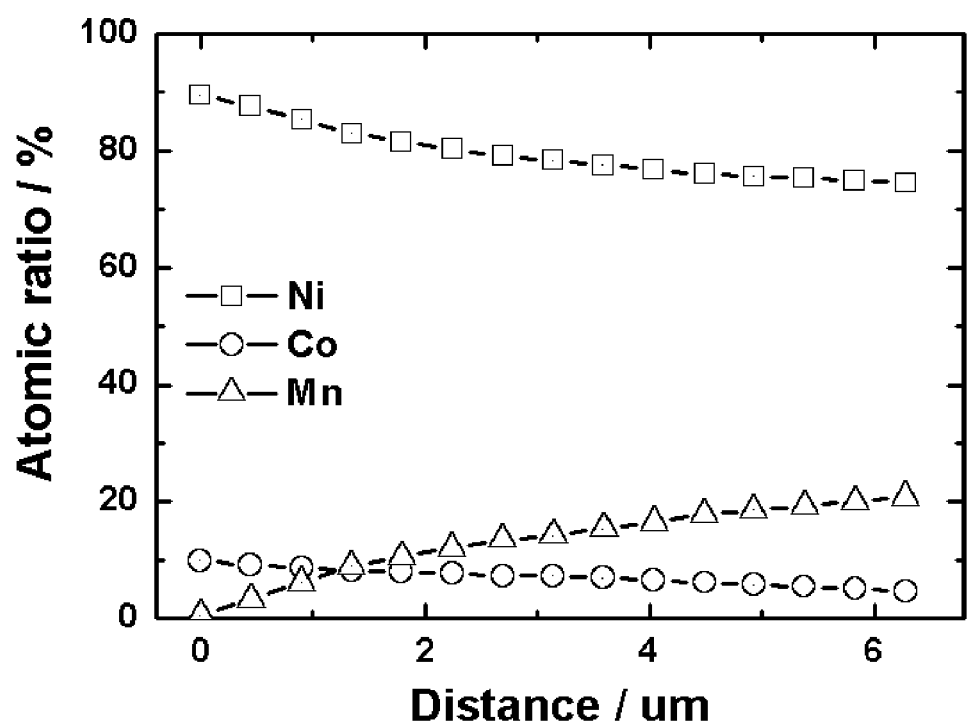
Figure 5:
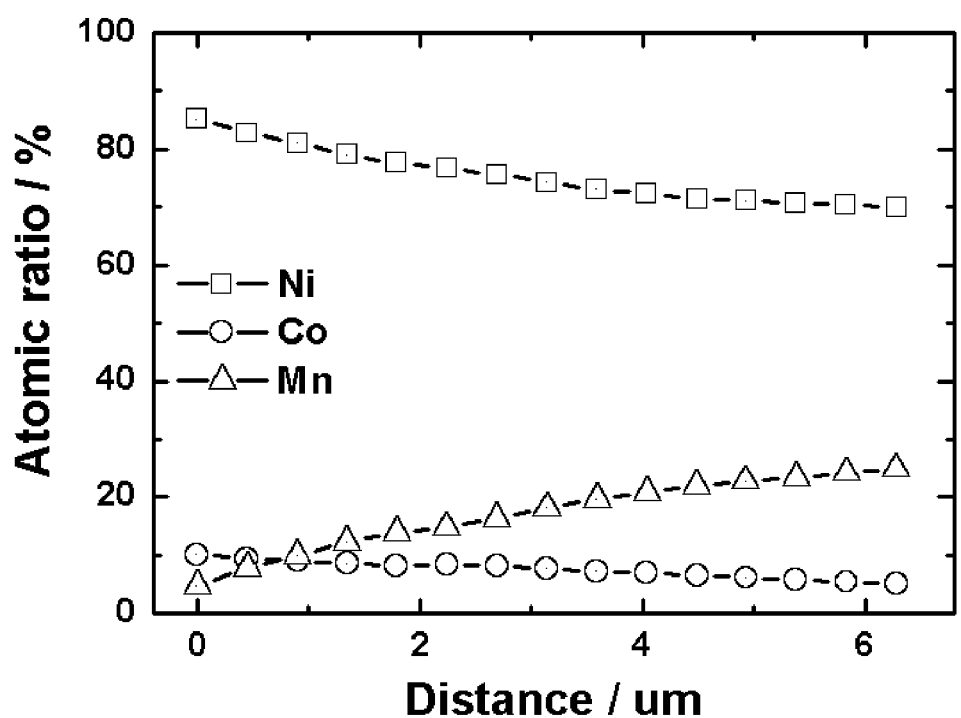
Figure 6:
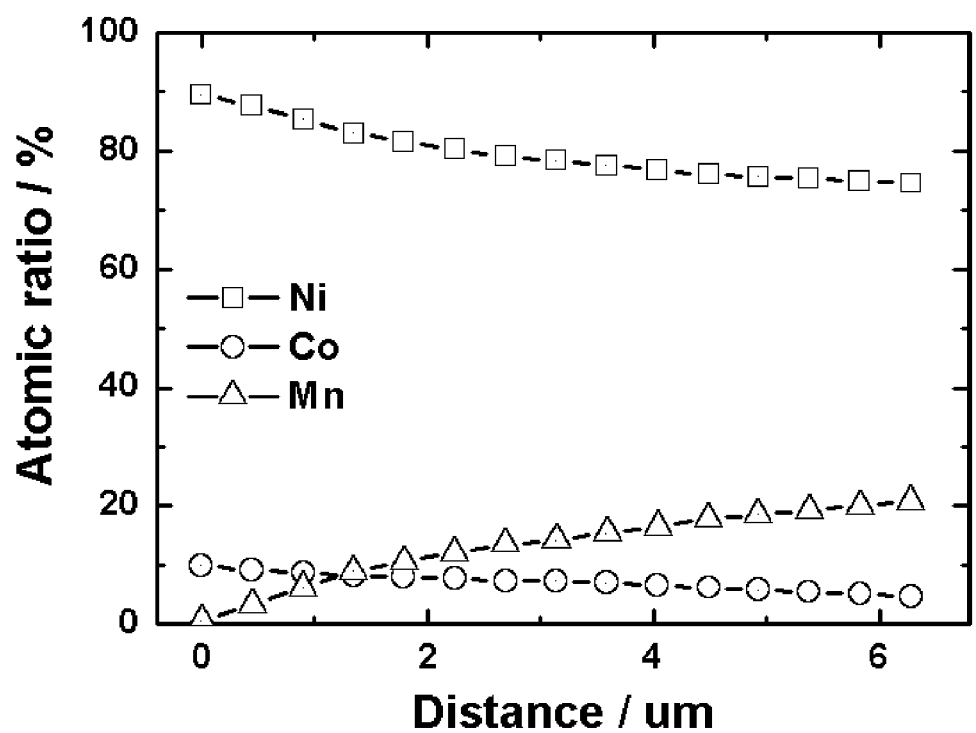

In order to confirm the concentration gradient structure of each metal from the core to the surface of the precursor particle of the present invention, the atomic ratio in each precursor particle prepared in Examples 1 to 6 was measured by using EPMA (Electron Probe Micro Analyzer) while moving form the core to the surface part, and the results are shown in FIGS. 1 to 6, respectively.

As shown in FIGS. 1 to 6, it was confirmed that in the case of the precursors prepared in Examples 1 to 6, the Ni metal concentration from the core to the surface was decreased, and the Mn and Co concentrations were gradually increased with certain gradient.

Test Example 2

Figure 7:
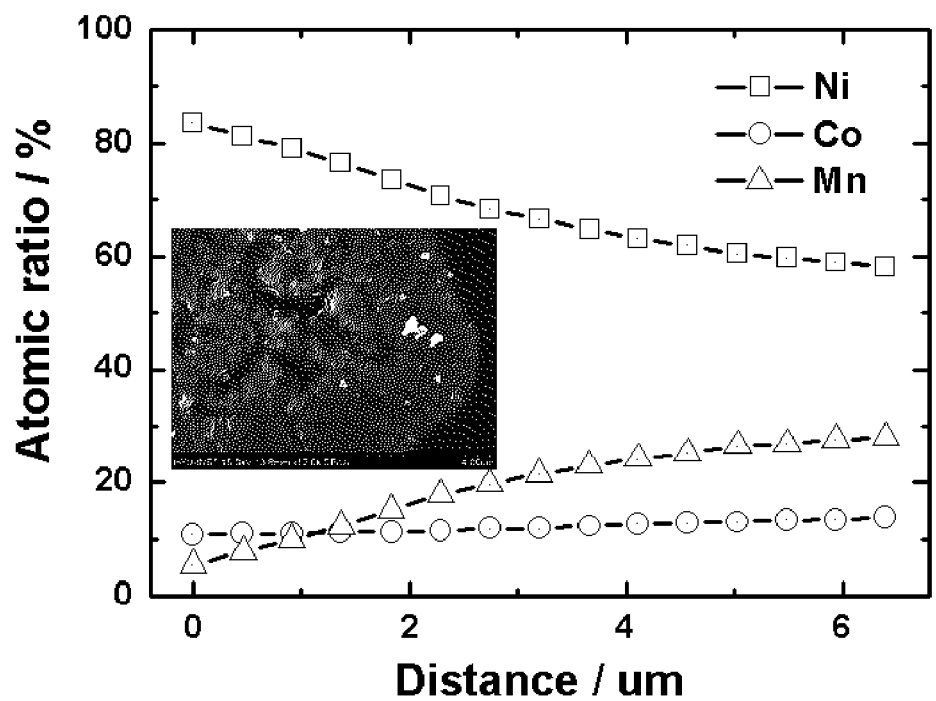
FIGS. 7 to 12: the results measuring the atomic ratio in each precursor particle prepared in Examples 1 to 6 of the present invention after heat-treating, respectively.
Figure 8:
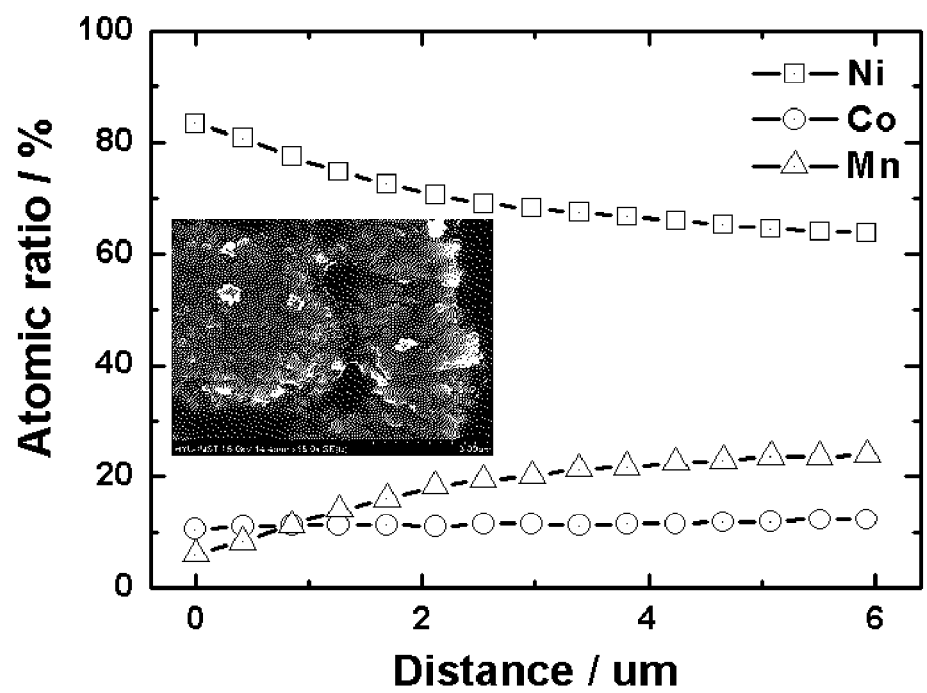
Figure 9:
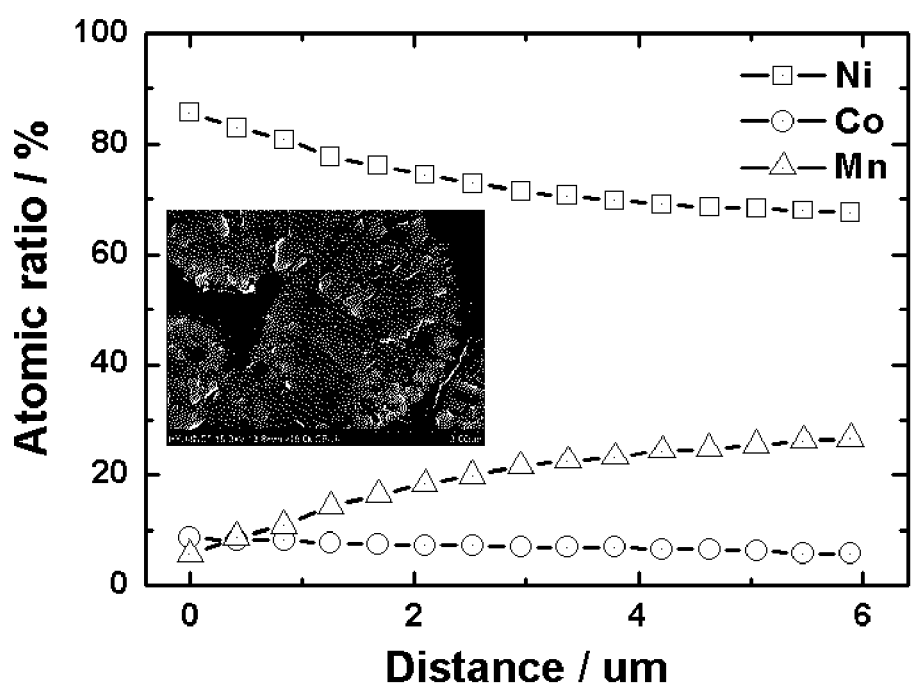
Figure 10:
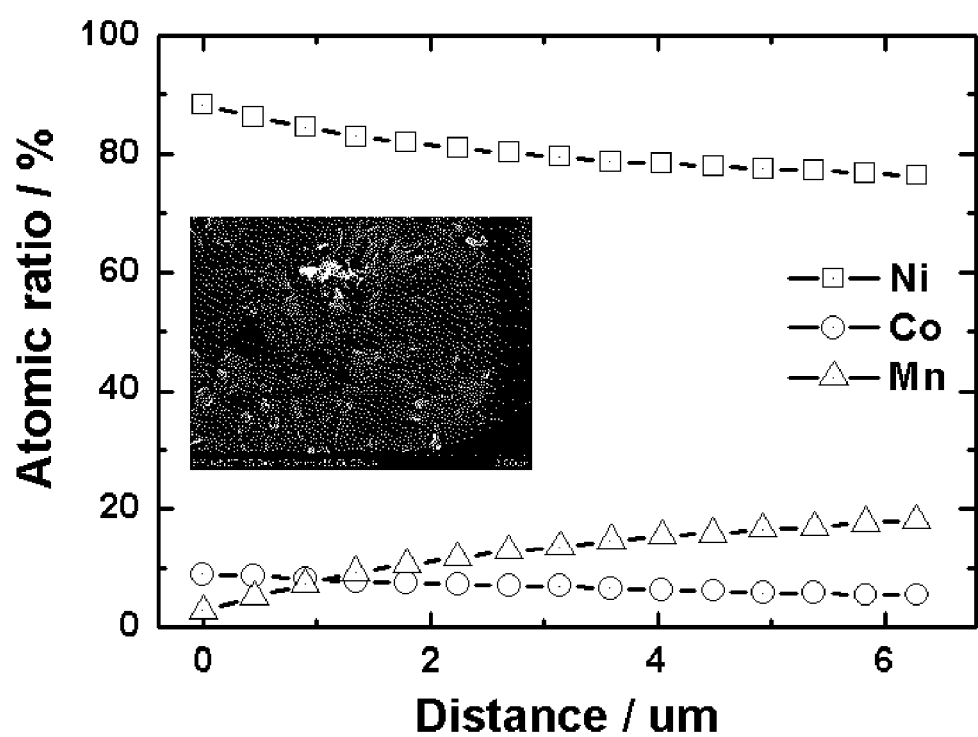
Figure 11:
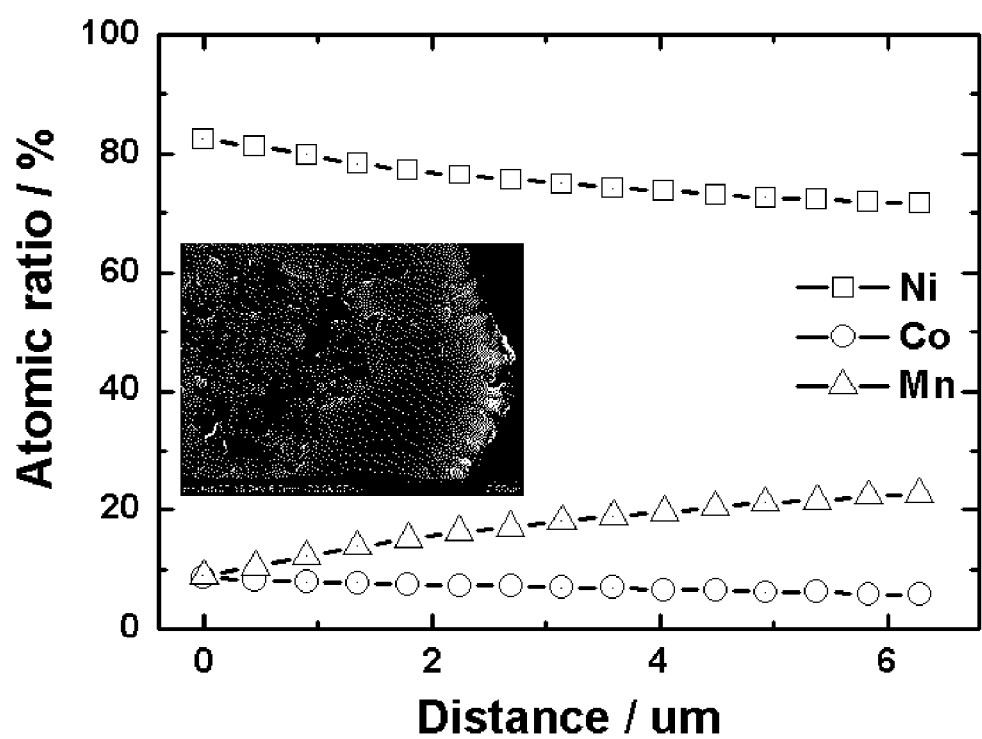
Figure 12:
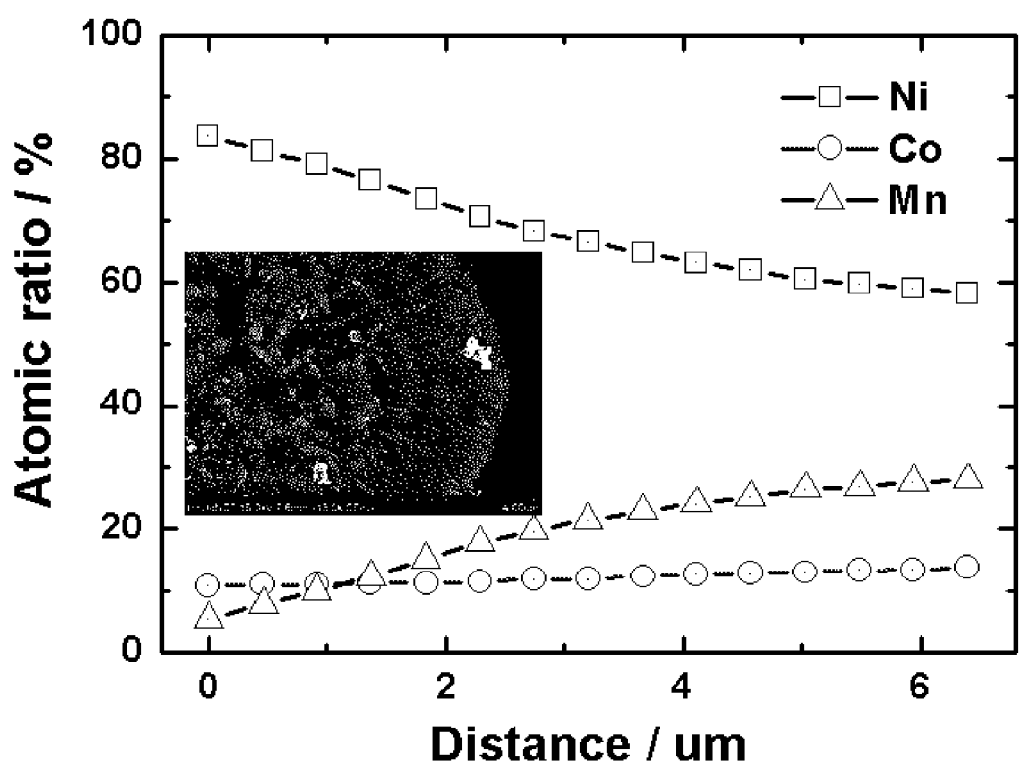

Confirmation of Concentration Gradient Structure in Active Material Particle after Heat-Treatment In order to confirm whether each metal shows concentration gradient from the particle core to the surface part after heat-treating the precursor of the present invention, the atomic ratio was measured by using EPMA (Electron Probe Micro Analyzer) while moving from the core to the surface, and the results are shown in FIGS. 7 to 12, respectively.

In FIGS. 6 to 9, it could be confirmed that: the Ni metal concentration was decreased, and the concentrations of the Co and the Mn at the core were little changed by the diffusion between the metal salts, but the Co and Mn concentrations were gradually increased with certain gradient.

Test Example 3

Measuring Charging/Discharging Capacity and Cycle Characteristics

Cathodes were prepared by using the active materials prepared in Examples 1 to 6 and the active materials prepared in Comparative Examples 1 to 7, and applied to cylindrical lithium secondary batteries, respectively.

Figure 13:
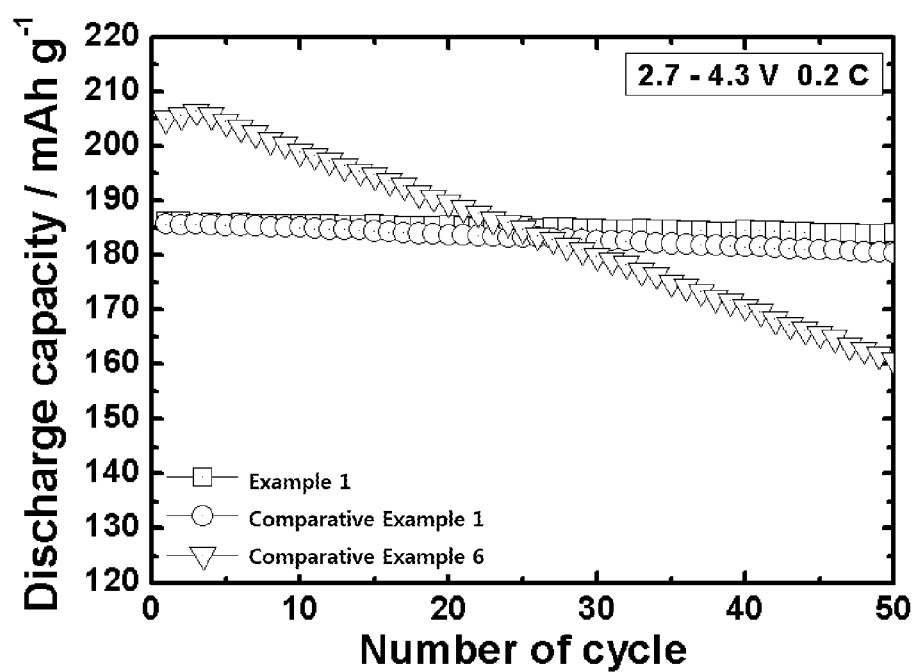
FIGS. 13 to 18: the results of charging/discharging test and the results measuring cycle characteristics of each battery prepared by using the active materials prepared in Examples 1 to 6 of the present invention and the active materials prepared in Comparative Examples 1 to 7, respectively.
Figure 14:
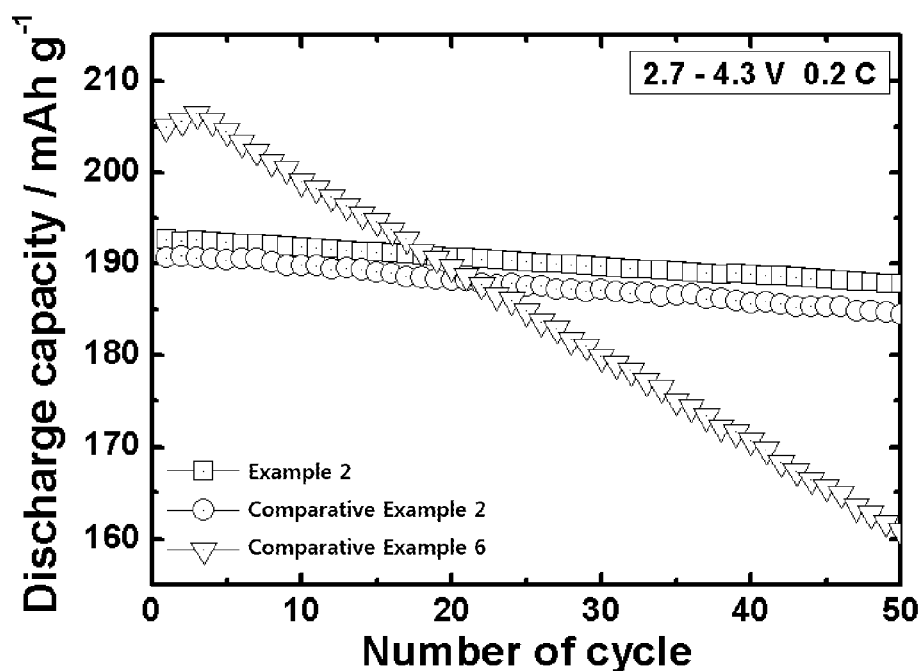
Figure 15:
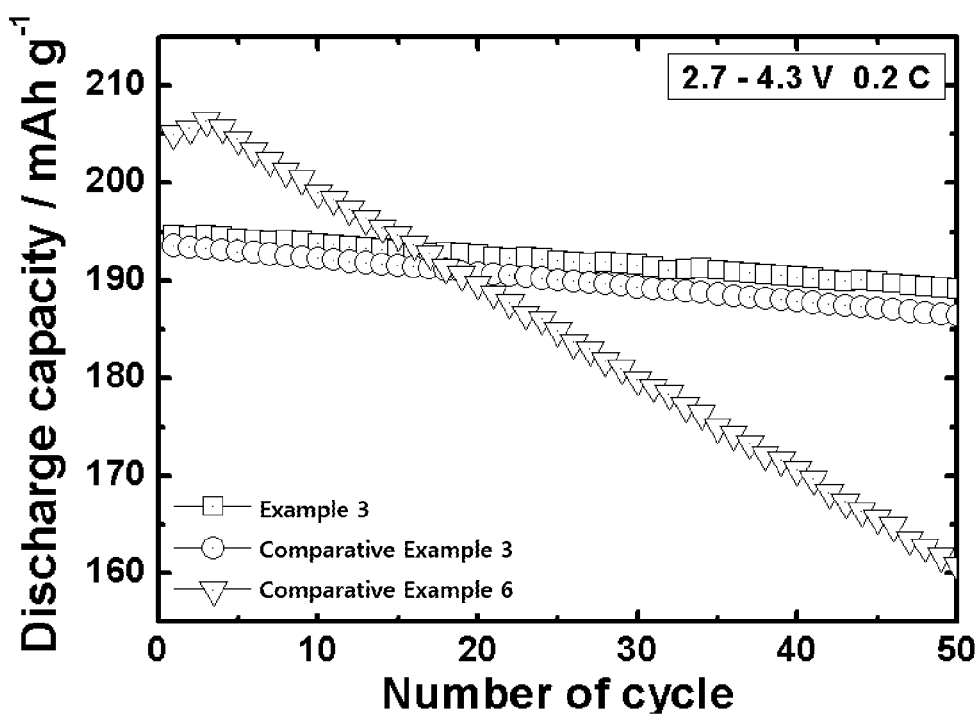
Figure 16:
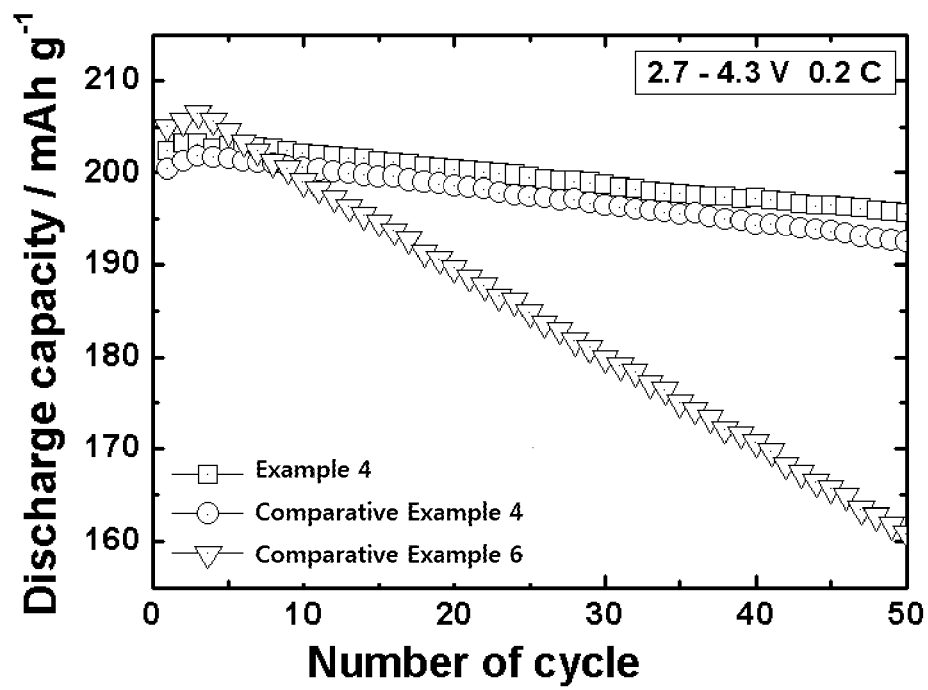
Figure 17:
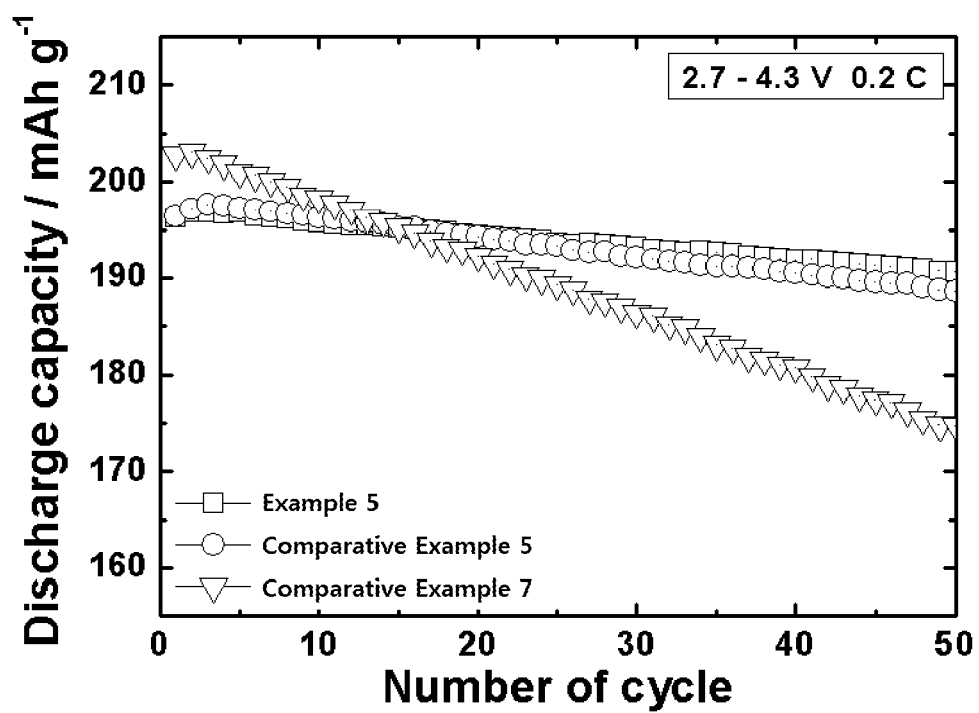
Figure 18:
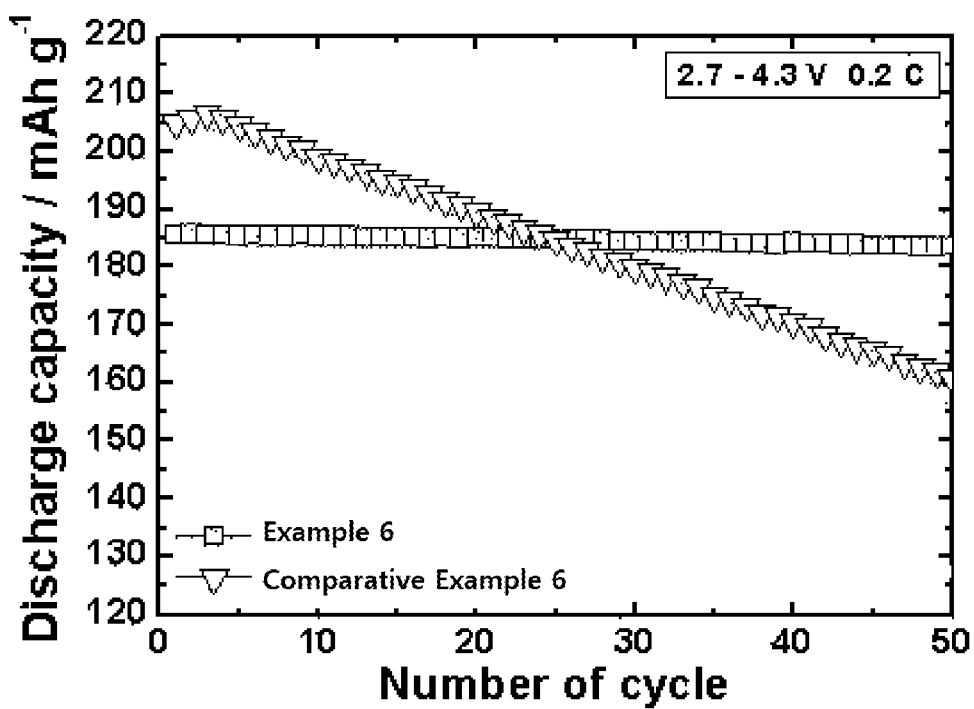

For the batteries prepared by using the active materials prepared in Examples 1 to 6, charging/discharging test and cycle characteristics were measured, and the results are shown in FIGS. 13 to 18. The charging/discharging was conducted 10 times per each sample at the condition of 2.7~4.3 V and 0.2 C, and the average value was taken.

In FIGS. 13 to 18, the results of charging/discharging of Examples 1 to 6, Comparative Examples corresponding to each bulk composition and Comparative Examples representing each core composition are shown. In FIGS. 13 to 18, Examples 1 to 6 showed similar charging/discharging characteristics with Comparative Examples corresponding to each bulk composition, but Comparative Examples representing the core composition showed very poor charging/discharging characteristics.

Test Example 4

Evaluation of Thermostability by DSC Measurement

Figure 19:
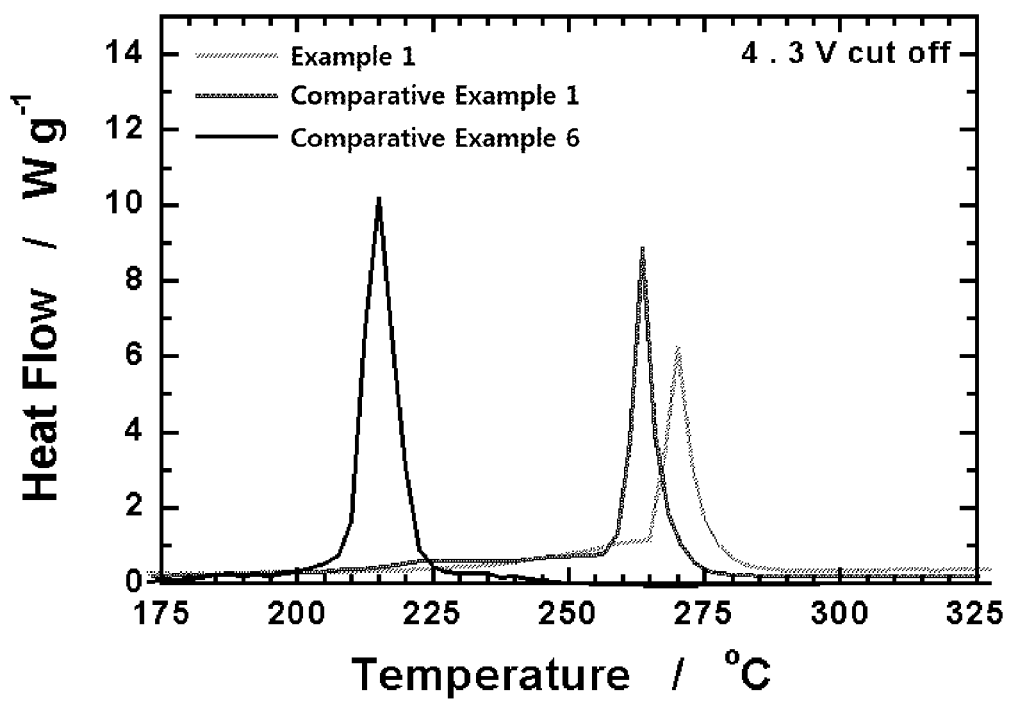
FIGS. 19 to 24: the results measuring heat flow of each cathode including active materials prepared in Examples 1 to 6 of the present invention and active materials prepared in Comparative examples 1 to 7, by charging at 4.3 V and then heating at the speed of 10° C./min by using a differential scanning calorimeter (DSC), respectively.
Figure 20:
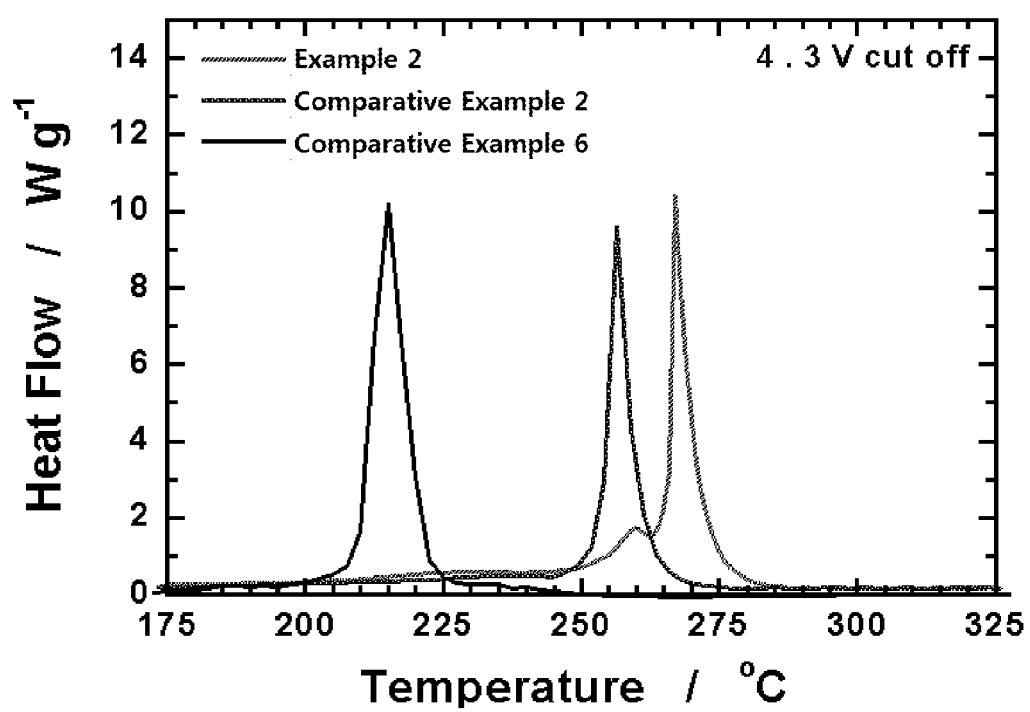
Figure 21:
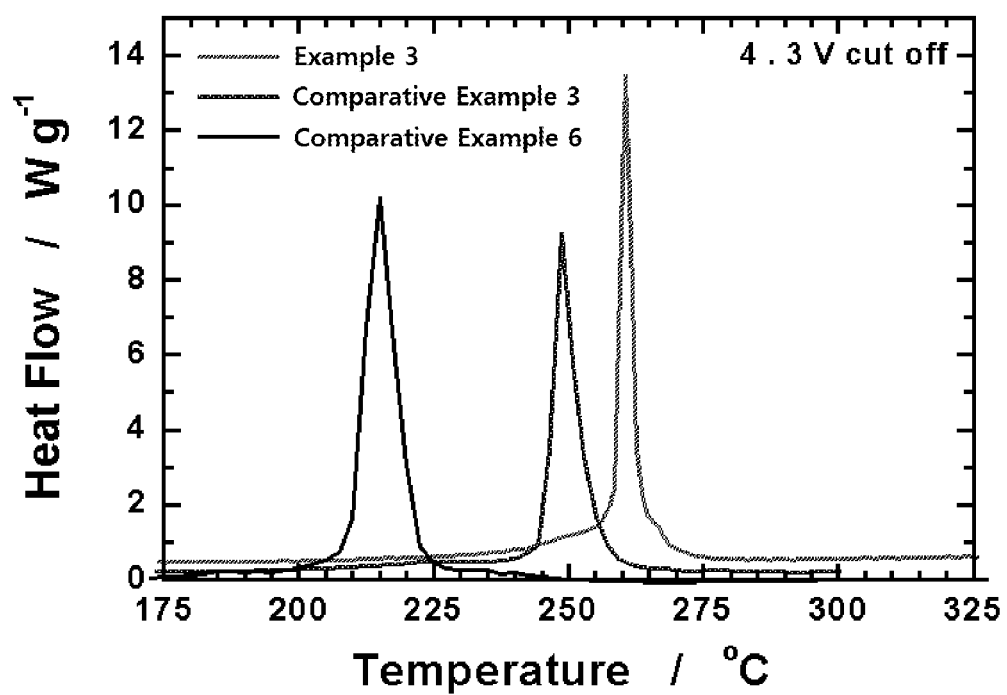
Figure 22:
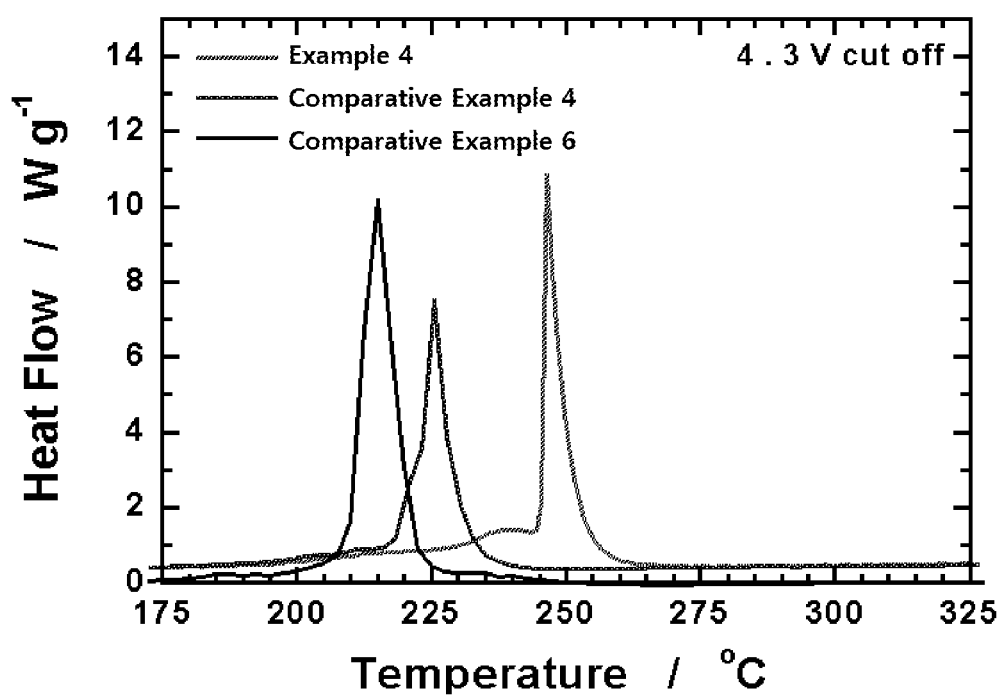
Figure 23:
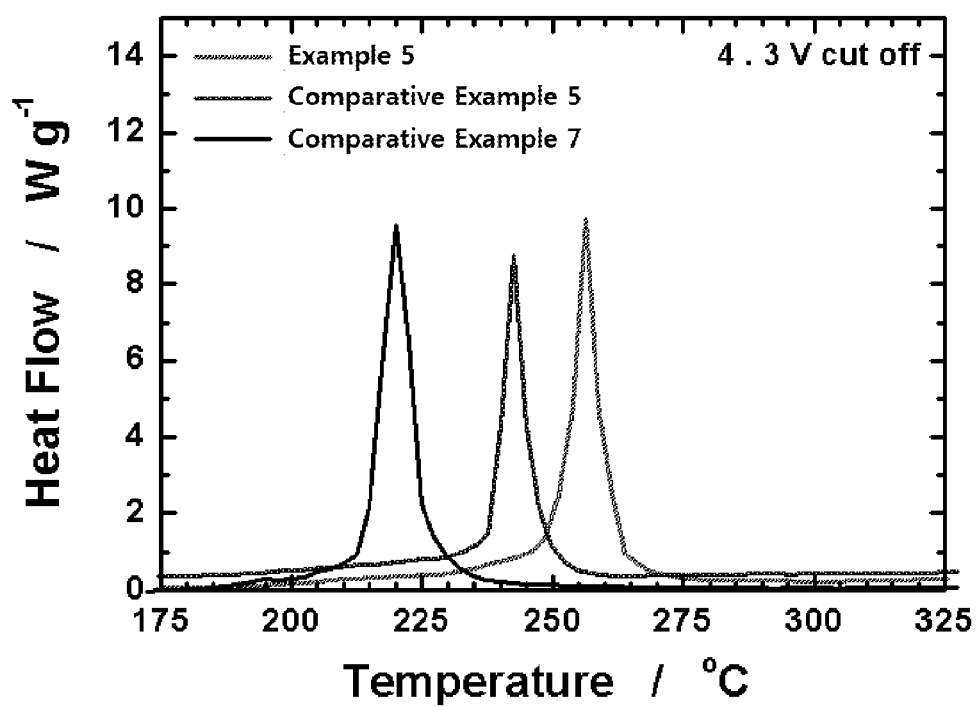
Figure 24:
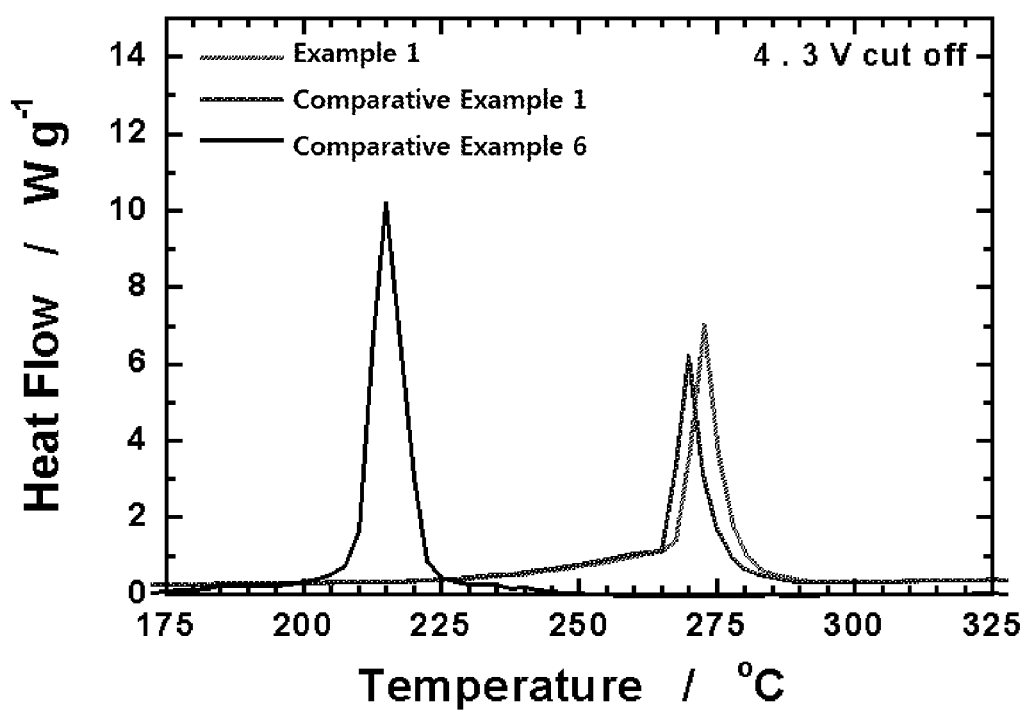

The cathodes containing the active materials prepared in Examples 1 to 6 and the active materials prepared in Comparative Examples 1 to 4, were charged at 4.3 V, respectively, and thermostability was measured by using a differential scanning calorimeter (DSC) and heating at a rate of 10° C./min. The results are shown in FIGS. 19 to 24.

As shown in FIGS. 19 to 24, the results of charging/discharging of Examples 1 to 6, Comparative Examples corresponding to each bulk composition and Comparative Examples representing each core composition are shown.

As shown in FIGS. 19 to 24, when the active materials prepared in Examples 1 to 6 according to the present invention were contained, an exothermic peak was showed at the higher temperature than Comparative Examples corresponding to each bulk composition and Comparative Examples representing each core composition. Thus, when the active materials prepared in Examples 1 to 6 according to the present invention were contained, the thermostability was much improved than when the active materials prepared in Comparative Examples 1 to 7 were contained.

Namely, in the present invention, the concentrations of all metals are increased or decreased with continuous concentration gradient from the core to the surface part. Accordingly, because the structures are not rapidly changed and show stability, it could be confirmed that the thermostability is largely increased.

INDUSTRIAL APPLICABILITY

In the cathode active material for a lithium secondary battery according to the present invention, the concentrations of all metals contained in the cathode active material are increased or decreased with continuous concentration gradient from the core to the surface part. Accordingly, the crystal structure is stabilized and the thermostability is increased because there is no phase boundary having rapid concentration change from the core to the surface part.

While the invention has been described with respect to the above specific embodiments, it should be recognized that various modifications and changes may be made and also fall within the scope of the invention as defined by the claims that follow.

What is claimed is:

1. A cathode active material for a lithium secondary battery with whole particle concentration gradient comprises:
the core expressed by the following formula 1; and
the surface part expressed by the following formula 2,

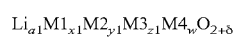  [Formula 1]

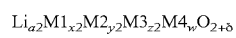  [Formula 2]

wherein,
the concentrations of the M1, the M2 and the M3 have continuous concentration gradient from the core to the surface;

M1, M2 and M3 are selected from the group consisting of Ni, Co, Mn and a combination thereof;

M4 is selected from the group consisting of Fe, Na, Mg, Ca, Ti, V, Cr, Cu, Zn, Ge, Sr, Ag, Ba, Zr, Nb, Mo, Al, Ga, B and a combination thereof; $0<a1\leq 1.1$, $0<a2\leq 1.1$, $0\leq x1\leq 1$, $0\leq x2\leq 1$, $0\leq y1\leq 1$, $0\leq y2\leq 1$, $0\leq z1\leq 1$, $0\leq z2\leq 1$, $0\leq w\leq 0.1$, $0.0\leq\delta\leq 0.02$, $0<x1+y1+z1\leq 1$, $0<x2+y2+z2\leq 1$, $x1\leq x2$, $y1\leq y2$ and $z2\leq z1$;

the concentrations of all metals making up the cathode active material show continuous concentration gradient in the entire region, from the particle core to the surface part, the particle core is within the diameter 0.2 μm from the center of the active material particle, and wherein the concentration of Co change from the particle core to the surface part is more than 0 but equal or less than 0.83 mol % per μm.

2. The cathode active material according to claim 1, wherein the concentration of M1 is increased from the core to the surface part with continuous concentration gradient, the concentration of M2 is increased from the core to the surface part with continuous concentration gradient, and the concentration of the M3 is decreased from the core to the surface part with continuous concentration gradient.

3. The cathode active material according to claim 2, wherein M1 is Co, M2 is Mn and M3 is Ni.

4. The cathode active material according to claim 2, wherein the concentration range of M3 at the core, z1 is $0.6\leq z1\leq 1$, and the concentration difference between the core and the surface part of the M3 is $0.2\leq |z2-z1|\leq 0.4$.

5. The cathode active material according to claim 2, wherein the concentration range of M1 at the core, x1 is $0\leq x1\leq 0.2$, and the concentration difference between the core and the surface part of the M1 is $0.05\leq |x2-x1|\leq 0.1$.

6. The cathode active material according to claim 2, wherein the concentration range of M2 at the core, y1 is $0\leq y1\leq 0.1$, and the concentration difference between the core and the surface part of M2 is $0.2\leq |y2-y1|\leq 0.4$.

7. The cathode active material according to claim 1, wherein the concentration gradients of M1, M2 and M3 are constant from the particle core to the surface part.

8. A lithium secondary battery comprising the cathode active material of claim 1.

9. The cathode active material according to claim 1, wherein the surface part of the particle is within the radius 0.2 μm from the outermost shell of the active material particle.

10. A method for preparing a cathode active material according to claim 1 comprises:

a first step of preparing a metal salt aqueous solution for forming the core and a metal salt aqueous solution for forming the surface part, which contain M1, M2 and M3 as a metal salt aqueous solution, wherein the concentrations of M1, M2 and M3 are different each other;

a second step of forming precipitates by mixing the metal salt aqueous solution for forming the core and the metal salt aqueous solution for forming the surface part at a mixing ratio from 100 v %: 0 v % to 0 v %: 100 v % with gradual change and by mixing a chelating agent and a basic aqueous solution to a reactor at the same time, wherein the concentrations of M1, M2 and M3 have continuous concentration gradient from the core to the surface part;

a third step of preparing an active material precursor by drying or heat-treating the obtained precipitates; and a fourth step of mixing the active material precursor and a lithium salt and then heat-treating thereof.

11. The method according to claim 10, wherein the molar ratio of the chelating agent and the metal salt aqueous solution is 0.2 to 1.0:1.

12. The method according to claim 10, wherein the heat-treating process after mixing the active material precursor and the lithium salt is conducted at 700 to 1100° C.

13. The method according to claim 10, which further comprises a pre-calcining process by maintaining at 250 to 650° C. for 5 to 20 hours, before heat-treating after mixing the active material precursor and the lithium salt.

14. The method according to claim 10, wherein in the second step, pH is within 10 to 12.5, reaction temperature is within 30 to 80° C., and reaction stirring speed is within 100 to 2000 rpm under nitrogen flow.

* * * * *